United States Patent [19]
Keele

[11] Patent Number: 5,964,910
[45] Date of Patent: Oct. 12, 1999

[54] DIFFUSING FILTER FOR DOWNDRAFT AIR MOVING APPLIANCES

[76] Inventor: Rex A. Keele, 23 N. 1050 West, Clearfield, Utah 84015

[21] Appl. No.: 09/003,036

[22] Filed: Jan. 5, 1998

[51] Int. Cl.⁶ .................................................. B01D 29/05
[52] U.S. Cl. ........................ 55/385.1; 55/385.2; 55/481; 55/484; 55/506; 55/DIG. 29
[58] Field of Search ................. 55/385.1, 385.2, 55/481, 484, 506, DIG. 29

[56] References Cited

U.S. PATENT DOCUMENTS

| | | | |
|---|---|---|---|
| 2,575,499 | 11/1951 | Manow | 55/506 |
| 3,808,777 | 5/1974 | Neumann et al. | |
| 4,088,463 | 5/1978 | Smith | |
| 4,175,936 | 11/1979 | Lough et al. | |
| 4,682,993 | 7/1987 | Todd et al. | 55/506 |
| 4,976,757 | 12/1990 | Helmus | |
| 5,389,120 | 2/1995 | Sewell et al. | 55/419 |
| 5,399,180 | 3/1995 | Kopp | 55/506 |
| 5,454,756 | 10/1995 | Ludwig | 55/385.2 |
| 5,641,342 | 6/1997 | Smith et al. | 55/506 |
| 5,679,121 | 10/1997 | Kim | 55/506 |
| 5,743,793 | 4/1998 | Parks et al. | 55/385.2 |

*Primary Examiner*—Jay H. Woo
*Assistant Examiner*—Minh-Chau T. Pham
*Attorney, Agent, or Firm*—Terrance L. Siemens

[57] ABSTRACT

A combined air filter and diffuser for attachment beneath an air discharge duct discharging blown air into a room of a building. The air filter is configured to abut and be flushly mounted to the ceiling immediately below the duct. The filter has a housing including a track disposed to receive a flat air filter element so that the filter element lies horizontally proximate the ceiling. The housing has a slidably removable closure exposing the filter element for removal, which is accomplished by sliding the filter element horizontally from the housing. The housing includes a diffuser having pivotally mounted fins disposed immediately below the filter element. The housing mounts to the ceiling by receiving fasteners through small opening formed in an upper, horizontal wall of the housing.

6 Claims, 2 Drawing Sheets

DIFFUSING FILTER FOR DOWNDRAFT AIR MOVING APPLIANCES

BACKGROUND OF THE INVENTION

1. Field of the Invention

The present invention relates to appliances containing fans, and more particularly to those having downdraft discharge of air located below a motor or bearing, as is typical of residential downdraft evaporative coolers. The fan containing appliance is improved by the present invention by incorporation of a drip catcher in the form of a filter for trapping and retaining oil droplets which may escape the fan motor or shaft bearings over time. In the absence of the filter, oil droplets could be propelled into the space being ventilated or conditioned by the appliance. Any building having a fan utilizing downdraft discharge may benefit from the invention.

2. Description of the Prior Art

Many air moving or conditioning appliances, such as evaporative coolers having downward air discharge generated by powered fans, are burdened with a potential drawback in that if a motor or bearing pillow block leaks oil, the leaking oil will enter the stream of air propelled by the appliance. This oil is susceptible to being blown into fine droplets and widely dispersed by air discharged from the appliance. Such an occurrence could readily contaminate environmental surfaces, architectural finishing materials, and objects contained within the room or living space into which the downdraft current flows.

Air conditioning devices such as evaporative coolers intended to be incorporated into buildings are frequently arranged to direct discharged air downwardly into residential, commercial, and industrial premises. As motorized mechanical equipment wears with use, likelihood of bearing failure increases. It would be desirable to provide a replaceable protective barrier such as a filter which would trap and retain both ordinary airborne contaminants, such as dust, as well as oil droplets entering the stream of discharged air as a consequence of bearing failure, in combination with a diffuser for diffusing the stream of discharged air as it enters the building space being conditioned.

U.S. Pat. No. 4,175,936, issued to Wendell J. Lough et al. on Nov. 27, 1979, describes a diffuser incorporating a replaceable filter. However, unlike the present invention, the filter of the diffuser of Lough et al. is vertically oriented, and would not be readily replaced by sliding into place from below without removing or significantly opening the diffuser. By contrast, the filter of the present invention is readily replaceable by sliding horizontally into and out of place. Also, Lough et al. lacks pivotally mounted air directing fins, as seen in the present invention.

U.S. Pat. Nos. 3,808,777, issued to Gebhard Max Neumann et al. on May 7, 1974, 4,088,463, issued to Irwin M. Smith on May 9, 1978, and 4,976,757, issued to Martin C. Helmus on Dec. 11, 1990, all describe filters mounted above ceilings of clean rooms. These devices are characterized in that removal of a filter element horizontally from the device in the manner of the present invention is not possible. In a second departure from the present invention, these devices lack diffusers located beneath a horizontally oriented filter, for redirecting discharged air from a vertical, downward direction.

None of the above inventions and patents, taken either singly or in combination, is seen to describe the instant invention as claimed.

SUMMARY OF THE INVENTION

The present invention provides a modular combined filter and diffuser which is particularly suitable for residential, commercial, and industrial settings. The diffusing filter mounts flush against and immediately below the ceiling of the room served by an air handling appliance having a fan or a shaft supported on bearings which are subject to failure and leakage of lubricant. It is located below the fan or bearing assembly such that leaking oil dispersed in the airstream is intercepted and retained. In many but not all applications, the appliance is an evaporative cooler mounted above the ceiling.

The novel diffusing filter has a filter element which can be removed readily. A short, elongated closure is removed to gain access to one side of the filter element. The filter element can then be slid out from its housing parallel to and immediately beneath the ceiling. Replacement is the reverse of removal. Thus, filter replacement does not require removal or significant disassembly of the diffusing filter. Few if any tools need be employed in replacing the filter element. Installation of a new filter requires handling no small fasteners, and can be performed without requiring direct observation of the interior of the diffusing filter.

The novel diffusing filter can employ conventional air filter elements commercially available for forced air heating systems. The filter element is conveniently and economically obtained, and will be effective at trapping and retaining airborne dust and dirt as well as oil droplets which become dispersed into the air stream should bearing failure occur.

Pivoting diffuser fins are mounted on the diffusing filter just below the filter element. These fins assure omnidirectional dispersion of discharged air, so that perceptible drafts are minimized, and so that all areas of a room or other building space are efficiently served by the appliance.

The novel diffusing filter may be mounted to the building by generally conventional means from below the ceiling. It is not required to install the diffusing filter only prior to completion of construction, nor is it required to significantly modify the building to install the diffusing filter.

Accordingly, it is a principal object of the invention to provide an air cleaning filter for a downdraft air handling appliance.

It is another object of the invention to locate the filter below any source of oil being dispersed into the stream of air discharged by the appliance.

It is a further object of the invention that the filter element be readily replaceable.

Still another object of the invention is to employ conventional air filtering elements.

An additional object of the invention is to assure that minimal disassembly, if any, is required to replace a filter element.

It is again an object of the invention to enable removal and replacement of a filter element by sliding it from the diffusing filter.

Yet another object of the invention is to provide a diffusing air filter which may be readily installed after completion of the building.

Still another object of the invention is that the functions of filtration and air diffusion be provided by one device.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 3 is a partially broken away perspective view showing details of the aperture and track for the sliding closure.

DETAILED DESCRIPTION OF THE PREFERRED EMBODIMENTS

Figure 1:
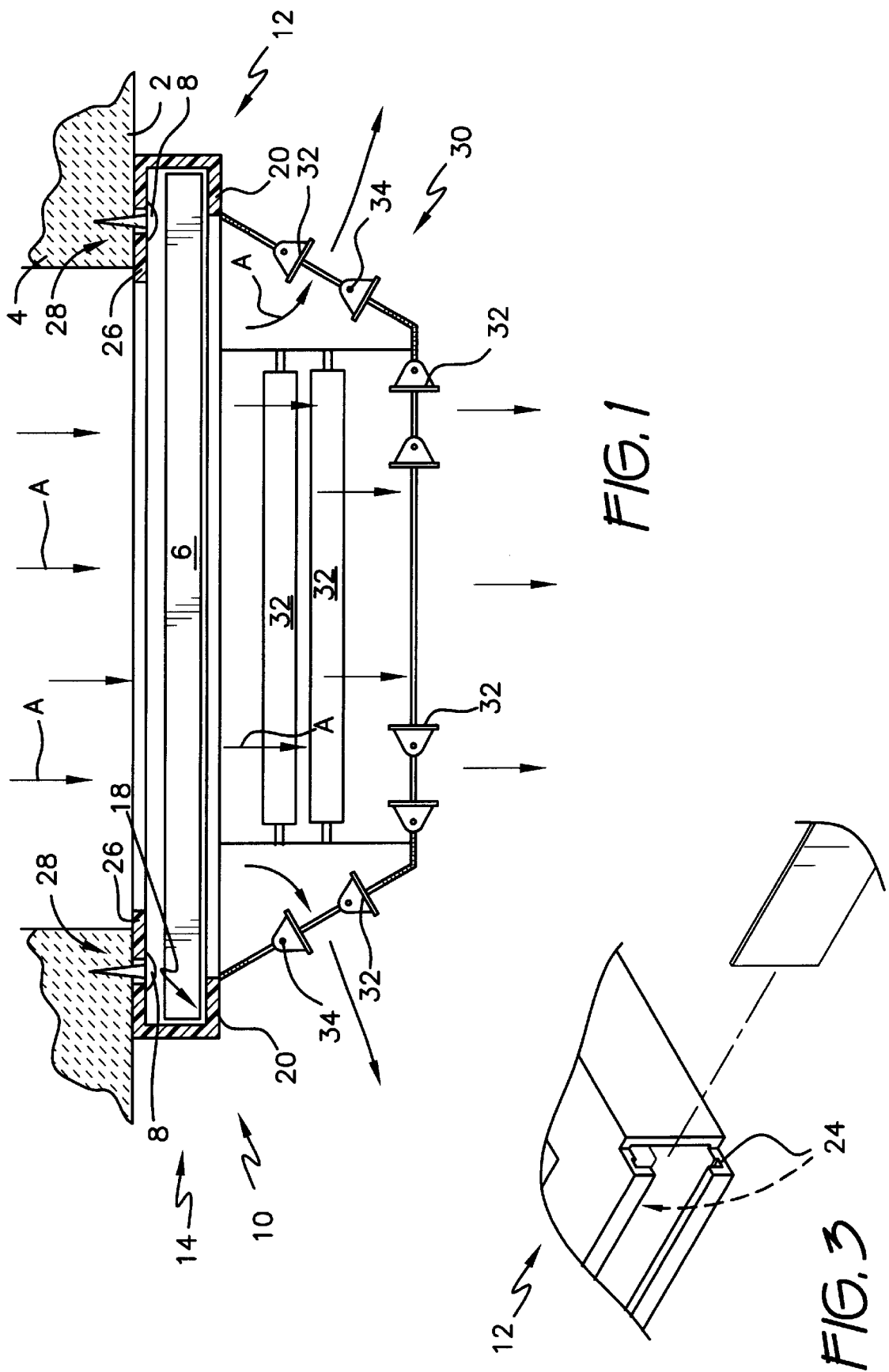
FIG. 1 is a partial cutaway side view of the present invention, showing both the filter and the diffuser.
Figure 2:
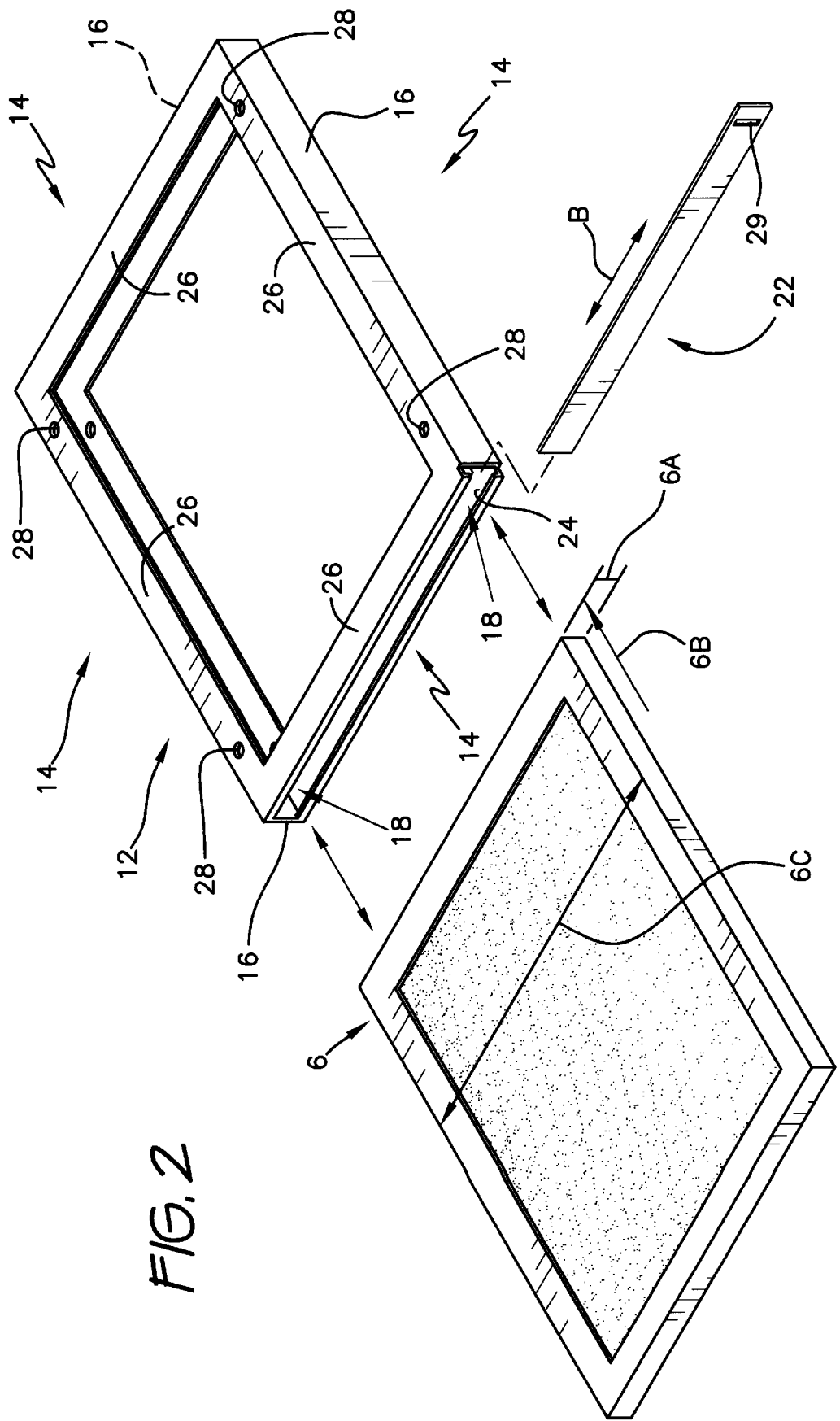
FIG. 2 is a perspective view of the filter housing and filter.

Turning now to FIGS. 1 and 2 of the drawings, novel air filter housing 10 is shown mounted horizontally to and abutting a ceiling 2 of a building (not shown in its entirety), directly below a duct 4 of an air handling appliance (not shown) conducting a downward air stream discharged by the appliance. Air flow of the air stream is indicated by arrows A. Housing 10 is adapted to receive a flat air filter element 6 and to support filter element 6 horizontally relative to ceiling 2.

Housing 10 comprises a body 12 having lateral sides 14 and a short, upstanding peripheral wall 16 open above and below. An aperture 18 is disposed in body 12 and affords access into body 12 such that filter element 6 may be manually removed.

A track 24 is disposed within body 12, for supporting filter element 6 in a horizontal orientation. Track 24 comprises wall 16 and an interiorly projecting bottom wall 20, so that filter element 6 is supported at the bottom thereof against falling downwardly, and is entrapped on three lateral sides 16 so that it cannot escape from body 12 by sliding laterally.

Filter element 6 is nominally flat, in that it comprises a nominal depth 6A of magnitude considerably less than those of the length 6B and width 6C thereof. Horizontal orientation of filter element 6 will be understood to signify that orientation existing when length 6B and width 6C are oriented horizontally. In practice, it is contemplated that depth 6A will be, illustratively, three quarters of an inch (2 cm), as this is a dimension frequently encountered in commercially available air filter elements 6.

Body 12 is closed at lateral sides 14 by wall 16, and where wall 16 is open to admit passage of filter element 6 for insertion and removal, by a sliding closure 22 disposed upon body 12. Sliding closure 22 affords access into housing 10 so that filter element 6 may be manually removed. Closure 22 slides into place, as shown by direction arrow B in FIG. 2. When inserted, closure 22 is supported in a track 24 formed in body 12. As clearly shown in FIG. 3, track 24 preferably includes elements of body 12 below, above, and to the side of opening 18, so that sliding closure 22 is suitably retained in a position closing body 12 and concealing filter element 6. Track 24 is located and configured to avoid interference with withdrawal of filter element 6.

Track 24 is vertically oriented in that it supports closure 22 from above and below in the vertical orientation shown in FIG. 2. Track 24 is dimensioned and configured to receive and support sliding closure 22 in sufficiently close cooperation as to retain closure 22 by friction yet sufficiently loosely to enable closure 22 to be manually withdrawn and inserted by sliding to reveal filter element 6. A grasping element, such as a slot or small, inconspicuous projection 29 is formed in closure 22 to expedite removal. Closure 22 is dimensioned and configured to remain within the confines of peripheral wall 16, so that closure 22 does not project to the exterior of wall 16, thus becoming obtrusive. It will be understood that "within the confines" will signify that other than projection 29, no part of closure 22 extends beyond the outermost length, width, and depth dimensions of body 12.

Body 12 includes a horizontal wall 26 disposed above and outside aperture 18. Wall 26 both reinforces body 12 and also bears small openings 28 for receiving fasteners 8 (see FIG. 1) enabling housing 10 to be mounted to the building being served. Horizontal wall 26 enables housing 10 to be mounted flush against ceiling 2 by pinning filter housing 10 to ceiling 2 by passing fasteners 8 upwardly through openings 28 into ceiling 2.

Housing 10 preferably includes a diffuser 30 having openings and baffles or fins 32 and associated air flow openings for diffusing or redirecting air stream to flow in many directions into the room or space being served, rather than vertically downwardly, as would be caused by duct 4 if no diffuser were present. Diffusing air is frequently performed when forced air is discharged into a room or space, and incorporation of diffuser 30 to the filtration apparatus described prior enables the filtration function to be achieved with minimal additional structure, compared to apparatus (not shown) providing only the diffusing function. Despite complexity arising from combining two functions, filter replacement may be accomplished with minimal effort, requiring only removal of closure 22 from body 12.

Diffuser 30 is attached to housing 10 below track 18, so that the air stream is both filtered and subsequently diffused. Diffuser 30 preferably includes journalling elements, such as pins 34 for pivotally mounting fins 32 within diffuser 30.

The invention is susceptible to variations and modifications which may be introduced thereto without departing from the inventive concept. Illustratively, closure 22 may take many forms. It may be hinged to body 12, so that full removal is not necessary. In place of track 24, closure 22 may be formed with ears or projections (not shown) enabling closure 22 to engage body 12, closure 22 thereby being withdrawn from body 12 in a direction similar to that by which filter element 6 is removed.

In further examples, fins 32 may be fixed to diffuser 30, rather than pivotally mounted. Also, wall 26 may project outwardly, rather than inwardly towards the air stream, so that fasteners 8 are more readily accessible. Diffuser 30 may be readily removable from body 12.

It is to be understood that the present invention is not limited to the embodiments described above, but encompasses any and all embodiments within the scope of the following claims.

I claim:

1. An air filter housing for receiving a flat air filter element and supporting the filter element horizontally relative to a ceiling of a building, below an air handling appliance and within a downward air stream discharged by the appliance, said air filter housing comprising:

a body having lateral sides and a short, upstanding peripheral wall open above and below, and closed at said lateral sides;

a track disposed within said housing, for supporting the flat filter element horizontally;

a diffuser attached to and extending below said track;

a vertically oriented channel, said channel being completely within the confines of said peripheral wall of said housing; and an openable closure, said closure being slidably received within said channel; wherein said closure is slid out of said channel in a first horizontal direction, to allow removal of the filter element from said housing by sliding the filter element in a second horizontal direction, thereby allowing replacement of the filter element without removing or disturbing said diffuser.

2. The air filter housing according to claim 1, wherein:

said diffuser includes fins and journalling elements; and said fins are pivotally mounted on said diffuser by said journalling elements.

3. The air filter housing according to claim 1, wherein said body further includes:

a horizontal wall disposed above and outside said track; and a first plurality of small openings in said horizontal wall; wherein said housing is mounted to the ceiling of the building by passing a plurality of fasteners upwardly through said first plurality of small openings and into the ceiling.

4. The air filter housing according to claim 3, said track further comprising a second plurality of small openings, wherein:

said second plurality of openings are substantially vertically aligned with said first plurality of small openings; and said housing is mounted to the ceiling of the building by passing the plurality of fasteners upwardly first through said second plurality of small openings, then through said first plurality of small openings and into the ceiling.

5. The air filter housing according to claim 1, wherein:

said closure includes one of a slot or a projection; and said one of said slot or said projection provides a place to grasp said closure to assist in sliding said closure.

6. An air filter housing for receiving a flat air filter element and supporting the filter element horizontally relative to a ceiling of a building, below an air handling appliance and within a downward air stream discharged by the appliance, said air filter housing comprising:

a track disposed within said housing, for supporting the flat filter element horizontally;

a body having lateral sides and a short, upstanding peripheral wall open above and below, and closed at said lateral sides, a horizontal wall disposed above and outside said track, a plurality of small openings in said horizontal wall, said housing being mounted to the ceiling of the building by passing a plurality of fasteners upwardly through first plurality of small openings and into the ceiling;

a diffuser attached to and extending below said track, said diffuser including fins and journalling elements, said fins being pivotally mounted on said diffuser by said journalling elements;

a vertically oriented channel, said channel being completely within the confines of said peripheral wall of said housing; and an openable closure, said closure being slidably received within said channel, said closure including one of a slot or a projection; wherein said closure is slid out of said channel in a first horizontal direction using one of said slot or said projection, to allow removal of the filter element from said housing by sliding the filter element in a second horizontal direction, thereby allowing replacement of the filter element without removing or disturbing said diffuser.

* * * * *